(12) United States Patent
Dong et al.

(10) Patent No.: US 12,411,377 B2
(45) Date of Patent: Sep. 9, 2025

(54) SCATTERING FILM, DISPLAY MODULE AND DISPLAY DEVICE

(71) Applicants: Hefei BOE Display Technology Co., Ltd., Anhui (CN); BOE TECHNOLOGY GROUP CO., LTD., Beijing (CN)

(72) Inventors: Wenbo Dong, Beijing (CN); Jianming Liu, Beijing (CN); Wei Kang, Beijing (CN); Xunwang Yu, Beijing (CN); Lu Niu, Beijing (CN)

(73) Assignees: Hefei BOE Display Technology Co., Ltd., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/913,213

(22) PCT Filed: Oct. 26, 2021

(86) PCT No.: PCT/CN2021/126239
§ 371 (c)(1),
(2) Date: Sep. 21, 2022

(87) PCT Pub. No.: WO2022/222402
PCT Pub. Date: Oct. 27, 2022

(65) Prior Publication Data
US 2023/0341722 A1    Oct. 26, 2023

(30) Foreign Application Priority Data
Apr. 23, 2021   (CN) .......................... 202110447120.6

(51) Int. Cl.
G02F 1/1335    (2006.01)

(52) U.S. Cl.
CPC .. *G02F 1/133504* (2013.01); *G02F 1/133528* (2013.01)

(58) Field of Classification Search
None
See application file for complete search history.

(56) References Cited

U.S. PATENT DOCUMENTS 8,163,372 B2 * 4/2012 Furui ................... G02B 5/0242
428/689
8,953,118 B2 * 2/2015 Nishimura ........ G02F 1/133606
349/63

(Continued)

FOREIGN PATENT DOCUMENTS

CN    101341427 A    1/2009
CN    101533110 A    9/2009

(Continued)

OTHER PUBLICATIONS

China Patent Office, First Office Action, Mar. 25, 2024, Appl'n No. CN202110447120.6.

(Continued)

*Primary Examiner* — Richard H Kim
(74) *Attorney, Agent, or Firm* — HOUTTEMAN LAW LLC

(57) ABSTRACT

Disclosed area scattering film, a display module and a display device. The scattering film includes: a scattering particle layer on a bearing layer, the scattering particle layer including a plurality of scattering particles and having a surface away from the bearing layer being a curved surface; 90% or more of the scattering particles in the scattering particle layer have a particle size larger than or equal to 5 μm and less than or equal to 30 μm.

15 Claims, 4 Drawing Sheets

(56) References Cited

U.S. PATENT DOCUMENTS

| | | | |
|---|---|---|---|
| 9,939,562 B2* | 4/2018 | Zhang | G02F 1/133611 |
| 2018/0067233 A1* | 3/2018 | Chen | G02B 5/3041 |
| 2019/0049642 A1* | 2/2019 | Ueno | G02F 1/133528 |

FOREIGN PATENT DOCUMENTS

| | | | |
|---|---|---|---|
| CN | 101815958 A | 8/2010 | |
| CN | 102200604 A | 9/2011 | |
| CN | 102265194 A | 11/2011 | |
| CN | 102483475 A | 5/2012 | |
| CN | 103208590 A | 7/2013 | |
| CN | 106324894 A | 1/2017 | |
| CN | 111278642 A | 6/2020 | |
| CN | 112331079 A | 2/2021 | |
| CN | 215180976 U | 12/2021 | |
| JP | 2001091707 A | 4/2001 | |
| JP | 2007241272 A | 9/2007 | |
| JP | 2020074016 A | 5/2020 | |

OTHER PUBLICATIONS

China Patent Office, Second Office Action dated Aug. 6, 2024, for corresponding Chinese application 202110447120.6.

* cited by examiner

SCATTERING FILM, DISPLAY MODULE AND DISPLAY DEVICE

The present application claims priority from the application No. 202110447120.6 titled "SCATTERING FILM, DISPLAY MODULE AND DISPLAY APPARATUS" filed on Apr. 23, 2021.

TECHNICAL FIELD

The present disclosure relates to the field of display technology, and specifically relates to a scattering film, a display module and a display device.

BACKGROUND

With the development of display technology, large-sized display screens are increasingly applied in teaching, meeting and other scenarios. In the process of teaching or meeting, a user often uses a sampling laser pointer to label the content displayed on the display screen.

SUMMARY

The present disclosure provides a scattering film, a display module and a display device.

In a first aspect, the present disclosure provides a scattering film including:
  a scattering particle layer on a bearing layer, the scattering particle layer including a plurality of scattering particles and having a surface away from the bearing layer that is a curved surface;
  wherein 90% or more of the scattering particles in the scattering particle layer have a particle size larger than or equal to 5 μm and less than or equal to 30 μm.

In some embodiments, an average particle size of all the scattering particles in the scattering particle layer is larger than 10 μm and less than or equal to 25 μm.

In some embodiments, an average particle size of all the scattering particles in the scattering particle layer is larger than or equal to 14 μm and less than or equal to 25 μm.

In some embodiments, all the scattering particles in the scattering particle layer have at least two different particle sizes.

In some embodiments, the scattering particles are made of a material including an inorganic non-metallic material or a metal oxide material.

In some embodiments, the scattering film further includes: a first protective layer on a surface of the scattering particle layer facing away from the bearing layer, a surface of the first protective layer away from the scattering particle layer being a curved surface.

In some embodiments, in at least partial region of the scattering particle layer, a surface of the first protective layer facing away from the bearing layer is conformal with the surface of the scattering particle layer facing away from the bearing layer.

In some embodiments, the first protective layer has a hardness greater than that of the scattering particles.

In some embodiments, the first protective layer is made of a material including an inorganic non-metallic material or a metal oxide material.

In some embodiments, the scattering particle layer further includes a dielectric material layer through which the scattering particles are fixed to a surface of the bearing layer.

In a second aspect, an embodiment of the present disclosure further provides a display module, including: a display panel and a scattering film on a light-emitting side of the display panel, wherein the scattering film is the scattering film as described above, and wherein the display panel includes a bearing layer configured to bear the scattering film and including a light transmissive material.

In some embodiments, the bearing layer includes: a polarization layer configured to change a polarization state of light passing through the polarization layer.

In some embodiments, the polarization layer includes a polarization layer body and a second protective layer in stack, and the scattering film is located on a side of the second protective layer away from the polarization layer body and in direct contact with the second protective layer.

In some embodiments, the bearing layer includes:
  a transparent base material layer, the scattering film being disposed on a surface of the transparent base material layer away from the polarization layer; and
  an optical adhesive layer bonded between the transparent base material layer and the polarization layer.

In some embodiments, the display panel is a liquid crystal display panel, including: a liquid crystal layer, and a glass substrate between the liquid crystal layer and the scattering film, and
  the scattering film further includes: a first protective layer on a surface of the scattering particle layer facing away from the bearing layer, and a dielectric material layer through which the scattering particles are fixed to a surface of the bearing layer;
  wherein at least one of the scattering particles, the first protective layer, or the dielectric material layer has a refractive index lower than or equal to that of the glass substrate.

In some embodiments, the display panel is a self-luminous display panel, and includes a light-emitting unit and at least one film layer between the light-emitting unit and the scattering film,
  the scattering film further includes: a first protective layer on the surface of the scattering particle layer facing away from the bearing layer, and a dielectric material layer through which the scattering particles are fixed to a surface of the bearing layer;
  wherein at least one of the scattering particles, the first protective layer, or the dielectric material layer has a refractive index lower than or equal to that of a film layer having a maximum refractive index between the light-emitting unit and the scattering film.

In a third aspect, an embodiment of the present disclosure provides a display device including the display module as described above.

BRIEF DESCRIPTION OF DRAWINGS

Accompanying drawings are provided for further understanding of this disclosure and constitute a part of the specification. Hereinafter, these drawings are intended to explain the present disclosure together with the following specific implementations, but should not be considered as a limitation to the present disclosure. In the drawings.

DETAIL DESCRIPTION OF EMBODIMENTS

To make the objects, technical solutions and advantages of the present disclosure clearer, the technical solutions in the embodiments of the present disclosure will now be described clearly and completely with reference to the accompanying drawings of the embodiments of the present disclosure. Apparently, the described embodiments are a part of, but not all, the embodiments of the present disclosure. Based on the described embodiments of the present disclosure, all the other embodiments obtained by those ordinary skilled in the art without any creative labor fall into the protection scope of the present disclosure.

The terminology used herein to describe embodiments of the present disclosure is not intended to limit and/or define the scope of the present disclosure. For example, unless otherwise defined, technical or scientific terms used in the present disclosure are intended to have general meanings as understood by those of ordinary skill in the art. It should be understood that the words "first", "second" and similar terms used in the present disclosure do not denote any order, quantity, or importance, but are used merely for distinguishing different components. The singular forms "a," "an," or "the" and similar referents do not denote a limitation of quantity, but rather denote the presence of at least one, unless the context clearly indicates otherwise. Words like "comprising" or "including" means that the element or item preceding the word includes elements or items that appear after the word or equivalents thereof, but does not exclude other elements or items. Words like "upper", "lower", "left", "right" are merely used to indicate a relative positional relationship, and when an absolute position of the described object is changed, the relative positional relationship may also be changed accordingly.

Figure 1:
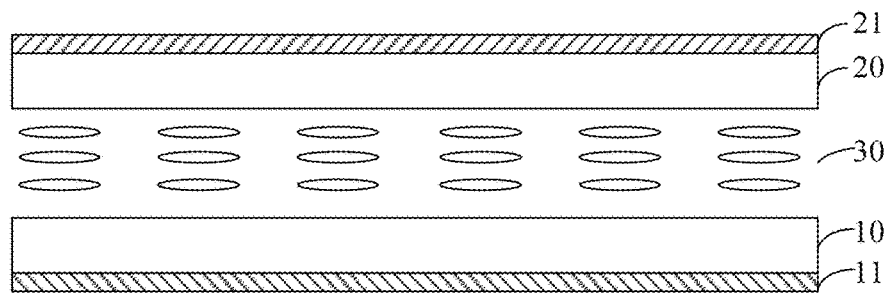
FIG. 1 is a schematic diagram of a display device according to an example.

In teaching, meeting, or other scenarios, some large-sized display devices (such as an integrated tablet computer) may be used in place of an apparatus such as a projector or an electronic whiteboard, and bring more convenience to teaching or meeting. FIG. 1 is a schematic diagram of a display device according to an example. As shown in FIG. 1, the display device includes: an array substrate 10, an assembling substrate 20, a liquid crystal layer 30, a first polarizer 11, a second polarizer 21, and a backlight source (not shown). The array substrate 10 and the assembling substrate 20 are disposed opposite to each other in an aligned manner, the liquid crystal layer 30 is disposed between the array substrate 10 and the assembling substrate 20, the first polarizer 11 is located on a side of the array substrate 10 away from the assembling substrate 20, and the second polarizer 21 is located on a side of the assembling substrate 20 away from the array substrate 10. For example, transmission and polarization directions of the first polarizer 11 and the second polarizer 21 are perpendicular to each other. The display principle of the display device is described below: natural light from the backlight source forms linearly polarized light after passing through the first polarizer 11; liquid crystal molecules in the liquid crystal layer 30 are deflected under an action of an electric field, so that a polarization direction of the linearly polarized light passing through the liquid crystal layer 30 is adjusted, and further, a transmittance of the linearly polarized light passing through the second polarizer 21 is adjusted, so as to display a corresponding gray scale.

In use of the display device, a user may use a laser pointer to emit laser to a screen of the display device, to explain the content displayed on the display device more conveniently. However, due to a poor scattering effect of the polarizer on laser in the conventional display device, when the laser pointer emits laser towards the screen, the laser pointer spot is visible merely at certain angles and is hardly visible at other angles, thereby affecting the user experience.

Figure 2:
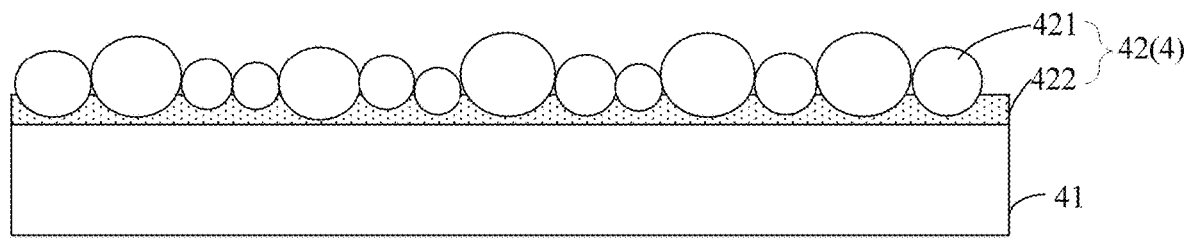
FIG. 2 is a schematic diagram of a scattering film according to some embodiments of the present disclosure.

FIG. 2 is a schematic diagram of a scattering film applied to a display device according to some embodiments of the present disclosure. As shown in FIG. 2, a scattering film 4 includes: a scattering particle layer 42 on a bearing layer 41. The bearing layer 41 is configured to transmit at least part of the light illuminated on the bearing layer 41. The scattering particle layer 42 includes a plurality of scattering particles 421, and a surface of the scattering particle layer 42 away from the bearing layer 41 is a curved surface. In the scattering particle layer 42, 90% or more of the scattering particles 421 have a particle size larger than or equal to 5 μm and less than or equal to 30 μm. Optionally, an average particle size of a plurality of scattering particles 421 in the scattering particle layer 42 is 10 μm or more. The scattering particles 421 may have a spherical or spheroidal shape, and the particle size of the scattering particles 421 is a diameter.

In the embodiments of the present disclosure, since the scattering film 4 includes the scattering particle layer 42, and the surface of the scattering particle layer 42 away from the bearing layer 41 is a curved surface, in a case where the scattering film 4 is disposed on a light-emitting side of the display panel and the scattering particle layer 42 is located on a side of the bearing layer 41 away from the display panel, the scattering particle layer 42 has a good scattering effect on laser so that a user can see the laser spot at various angles, and thus the user experience is improved. In addition, the inventor has found that when the scattering particles 421 have a too large particle size, the scattering film 4 at the light-emitting side of the display panel may affect the display quality of the display panel. For example, screen whitening may occur; and the scattering film 4 tends to be thicker. In contrast, when the scattering particles 421 have a too small particle size, the scattering film 4 has a weak scattering effect, but in the present disclosure, since 90% or more of the scattering particles 421 have a particle size larger than or equal to 5 μm and less than or equal to 30 μm, the scattering effect of the scattering film 4 is improved and the thickness of the scattering film 4 is reduced, while the image quality of the display screen is ensured.

Preferably, 90% or more of the scattering particles in the scattering particle layer have a particle size larger than or equal to 10 μm and less than or equal to 25 μm, so that the scattering effect of the scattering film 4 is further improved while the image quality of the display screen is ensured.

In some embodiments, an average particle sized of all the scattering particles 421 in the scattering particle layer 42 may be 10 μm or more, for example, 10 μm<d≤12 μm; for another example, 12 μm<d≤15 μm; for another example, 15 μm<d≤30 μm; for another example, 20 μm<d≤30 μm; and for another example, 10.5 μm<d≤25 μm. In a preferred implementation of the present disclosure, 14 μm≤d≤25 μm, so that the scattering effect of the scattering film 4 is improved as much as possible while the image quality of the display screen is ensured. In another preferred implementation, 16 µm≤d≤17 µm, so that the scattering effect of the scattering film 4 is further improved while the image quality of the display screen is ensured.

In some embodiments, a plurality of scattering particles 421 in the scattering particle layer 42 have at least two different particle sizes, so that a surface roughness of the scattering particle layer 42 is increased. For example, a plurality of scattering particles 421 in the scattering particle layer 42 have 3 to 5 different particle sizes. For another example, a plurality of scattering particles 421 in the scattering particle layer 42 have 5 to 10 different particle sizes. The number of scattering particles 421 per particle size is similar. In addition, the scattering particles 421 of different particle sizes are uniformly distributed over the bearing layer 41. Here, "uniformly distributed" means that when the region where the scattering particle layer 42 is located is divided into a plurality of unit regions, the number of scattering particles 421 in each unit region is substantially the same; and each unit region includes scattering particles 421 of each particle size.

In addition, a distance between the plurality of scattering particles 421 in the scattering particle layer 42 may be set to be smaller than a particle size of the scattering particle 421 with a smallest volume, so that the plurality of scattering particles 421 are distributed more densely, thereby improving the surface roughness of the scattering particle layer 42 and thus the scattering effect of the scattering film 4.

In an embodiment of the present disclosure, the scattering particles 421 are made of a light transmissive material so that light from the display panel is ensured to be transmitted through the scattering particle layer 42. For example, the scattering particles 421 may be made of an inorganic or organic material. In some embodiments, the scattering particles 421 may be made of a material including: an inorganic non-metallic material or a metal oxide material, so as to improve stability of the scattering particles 421, prevent the scattering particles 421 from being damaged, and thereby extend a service life of the scattering film 4. Exemplarily, the scattering particles 421 are made of a material including $SiO_2$, $Al_2O_3$, $TiO_2$, or $ZrO_2$. Apparently, other materials with high hardness and inert chemical properties may be used for the scattering particles 421.

To make the scattering particles 421 stably adhere to the surface of the bearing layer 41, as shown in FIG. 2, the scattering particle layer 42 further includes a dielectric material layer 422 through which the scattering particles 421 are fixed to the surface of the bearing layer 41. In preparation of the scattering particle layer 42, the scattering particles 421 may be uniformly mixed with a dielectric material solution first, and then the dielectric material solution doped with the scattering particles 421 is coated and cured on the surface of the bearing layer 41, thereby obtaining the scattering particle layer 42. The dielectric material layer 422 may have a thickness smaller than an average particle size of all the scattering particles 421 in the scattering particle layer 42, so as to ensure that a surface of the scattering particle layer 42 away from the bearing layer 41 is a curved surface with a certain roughness. In an example, the thickness of the dielectric material layer 422 is smaller than a particle size of the scattering particle 421 of the smallest particle size in the scattering particle layer 42. In an example, the thickness of the dielectric material layer 422 is smaller than or equal to a radius of the scattering particle 421 of the smallest particle size in the scattering particle layer 42. In an example, the thickness of the dielectric material layer 422 is smaller than or equal to one third of the average particle size of all the scattering particles 421 in the scattering particle layer 42. In an example, the thickness of the dielectric material layer 422 is smaller than or equal to a half of the average particle size of all the scattering particles 421 in the scattering particle layer 42. The design in the above examples may enable a higher roughness of the surface of the scattering particle layer 42 away from the bearing layer 41.

The dielectric material layer 422 may be made of an organic material. Specifically, the dielectric material layer 422 may be formed by curing an organic colloid, such as acrylic resin.

Figure 3:
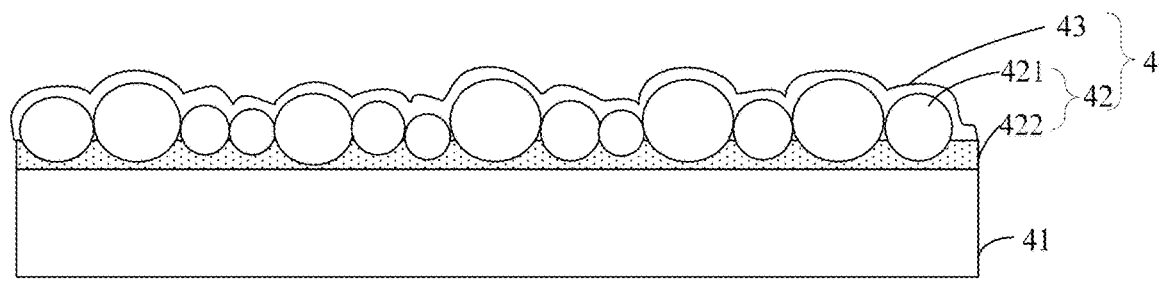
FIG. 3 is a schematic diagram of a scattering film according to some other embodiments of the present disclosure.

FIG. 3 is a schematic diagram of a scattering film 4 according to some other embodiments of the present disclosure. The scattering film 4 shown in FIG. 3 is similar to that of FIG. 2, except that in FIG. 3, the scattering film 4 may further include a first protective layer 43 on a surface of the scattering particle layer 42 facing away from the bearing layer 41. A surface of the first protective layer 43 away from the scattering particle layer 42 is a curved surface, so that the scattering effect of the scattering film 4 is guaranteed.

In some embodiments, in at least partial region of the scattering particle layer 42, a surface of the first protective layer 43 facing away from the bearing layer 41 is conformal with the surface of the scattering particle layer 42 facing away from the bearing layer 41. It should be noted that by "conformal," it means that two surfaces have a same or substantially a same shape. For example, the surface of the scattering particle layer 42 facing away from the bearing layer 41 includes a plurality of arc surfaces, the surface of the first protective layer 43 facing away from the bearing layer 41 also includes a plurality of arc surfaces, and the plurality of arc surfaces of the first protective layer 43 have a curvature equal to or approximately equal to the plurality of arc surfaces of the scattering particle layer 42. For example, a curvature at a highest point of each scattering particle 421 is the same as a curvature of a corresponding position in the first protective layer 43. The highest point of the scattering particle 421 is a point farthest from the bearing layer 41. The first protective layer 43 is configured to protect the scattering particle layer 42 and prevent the scattering particles 421 from being damaged by external abrasion. In order to improve the protection effect of the first protective layer 43 on the scattering particles 421, in some embodiments, the first protective layer 42 may have a hardness greater than the scattering particles 421.

The first protective layer 43 may be made of an inorganic non-metallic material or a metal oxide material. For example, the first protective layer 43 may be made of $SiO_2$, $Al_2O_3$, $TiO_2$ or $ZrO_2$.

Figure 4:
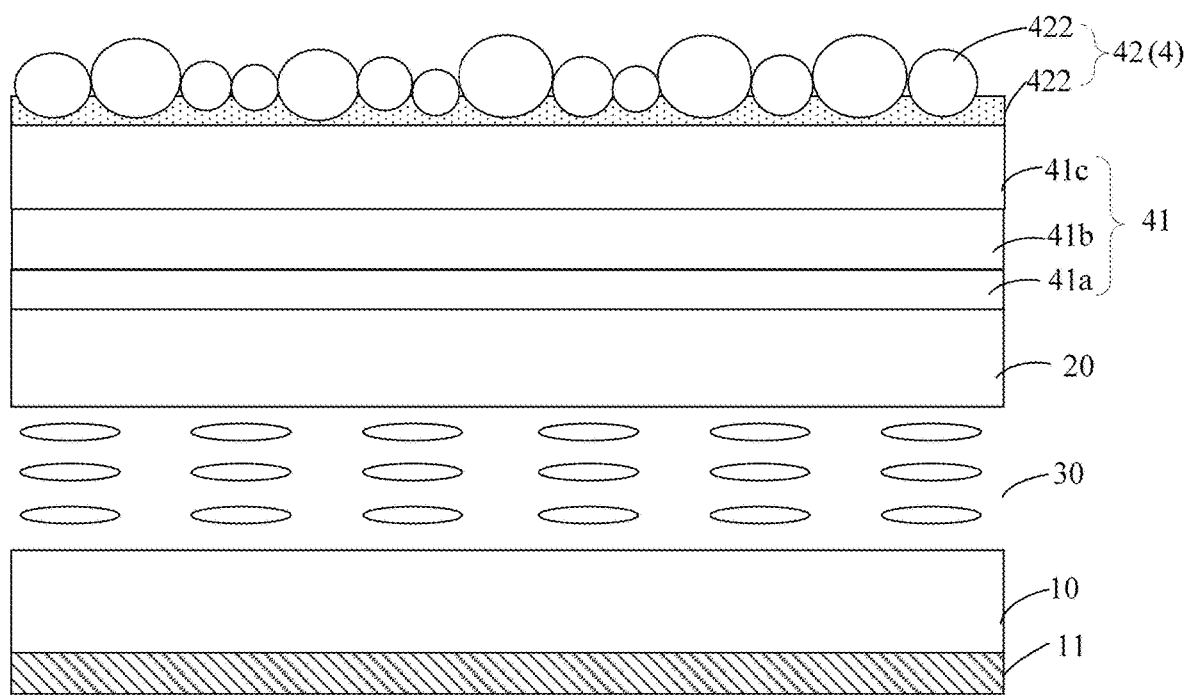
FIG. 4 is a schematic diagram of a display module according to some embodiments of the present disclosure.
Figure 5:
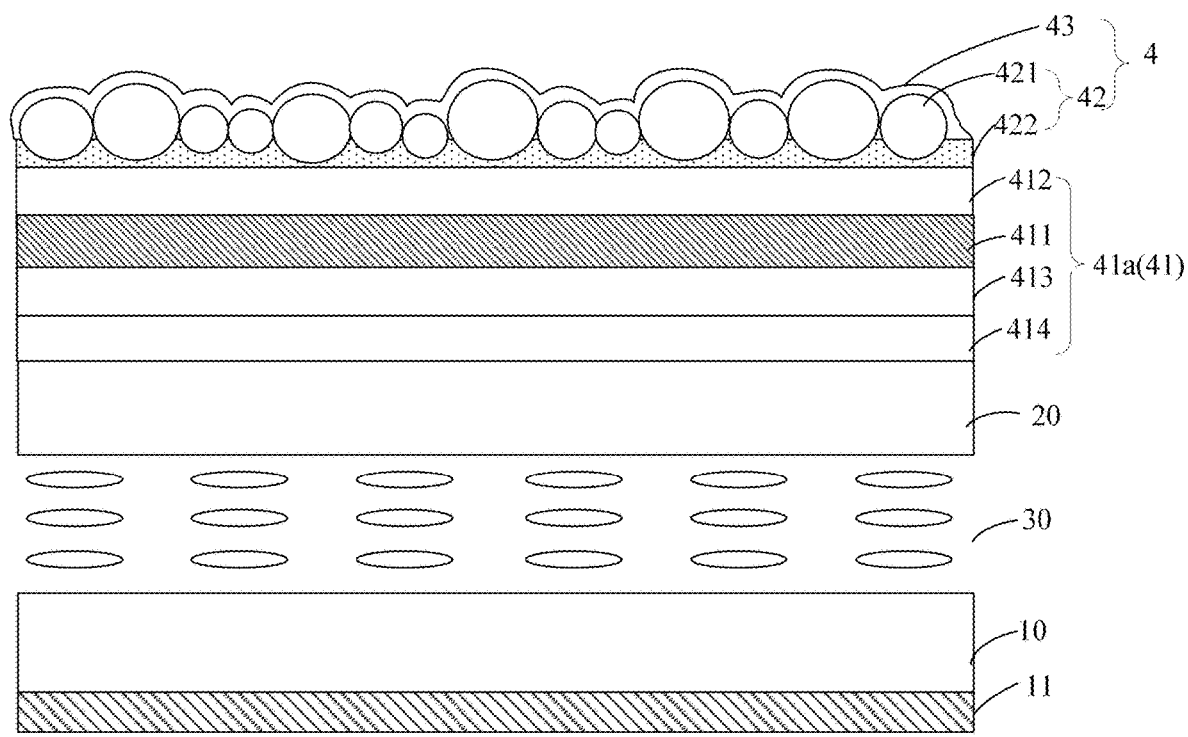
FIG. 5 is a schematic diagram of a display module according to some other embodiments of the present disclosure.

FIG. 4 is a schematic diagram of a display module according to some embodiments of the present disclosure. FIG. 5 is a schematic diagram of a display module according to some other embodiments of the present disclosure. As shown in FIGS. 4 and 5, the display module includes: a display panel and the scattering film 4 as described in any embodiment above. The display panel includes a bearing layer 41 configured to bear the scattering film 4. The scattering film 4 is disposed on a light-emitting side of the display panel, and a scattering particle layer 42 in the scattering film 4 is located on a side of the bearing layer 41 away from the display panel.

In some embodiments, the display panel is a liquid crystal display panel, including a liquid crystal cell and a bearing layer 41 on a side of the liquid crystal cell. As shown in FIGS. 4 and 5, the liquid crystal cell includes an array substrate 10 and an assembling substrate 20 disposed opposite to each other, and a liquid crystal layer 30 between the array substrate 10 and the assembling substrate 20. The liquid crystal display panel further includes a first polarizer 11 on a side of the array substrate 10 away from the assembling substrate 20, and the bearing layer 41 is located on a side of the assembling substrate 20 away from the array substrate 10.

In an example, as shown in FIGS. 4 and 5, the bearing layer 41 may include a polarization layer 41a. The polarization layer 41a is configured to change a polarization state of light passing through the polarization layer 411. For example, circularly polarized light passing through the polarization layer 41a is converted into linearly polarized light. As shown in FIG. 5, the polarization layer 41a includes a polarization layer body 411, a second protective layer 412, and a third protective layer 413. It should be noted that the polarization layer 41a may include both the second protective layer 412 and the third protective layer 413, or may include the second protective layer 412 but not the third protective layer 413.

The polarization layer body 411 may be made of a material including polyvinyl alcohol (PVA). Both the second protective layer 412 and the material of the third protective layer 413 may be made of a material including: any one of cellulose triacetate (TAC), polymethyl methacrylate (PMMA), thermoplastic polyurethane (TPU), polyimide (PI), or polyethylene terephthalate (PET). For example, both the second protective layer 412 and the material of the third protective layer 413 may be made of cellulose triacetate. The polyvinyl alcohol is a high molecular polymer dyed with various dichroic organic dyes and extending under certain humidity and temperature conditions to absorb the dichroic dyes and form polarization performance. The cellulose triacetate film layer has the advantages of high strength, high light transmittance and humidity resistance, and thus can properly protect the polyvinyl alcohol film layer.

In addition, as shown in FIG. 5, the polarization layer 41a may further include: an adhesive layer 414 on a side of the third protective layer 413 away from the polarization layer body 411, and configured to adhere the polarization layer 41a onto the liquid crystal cell. Before the display module is assembled (for example, before the polarization layer 41a is bonded to the liquid crystal cell), a release film, which is configured to prevent the adhesive layer 414 from impurities such as dust that may reduce the viscosity, may be attached to a surface of the adhesive layer 414 away from the polarization layer 41a. While the display module is assembled, the release film is peeled off, and the polarization layer 41a is bonded to the liquid crystal cell.

In an example, as shown in FIG. 5, the scattering film 4 may be in direct contact with the polarization layer 41a. For example, the scattering film 4 is formed directly on the second protective layer 412.

In another example, as shown in FIG. 4, the bearing layer 41 may further include, in addition to the polarization layer 41a: a transparent base material layer 41c and an optical adhesive layer 41b. The scattering film 4 is disposed on a surface of the transparent base material layer 41c away from the polarization layer 41a. The optical adhesive layer 41b is bonded between the transparent base material layer 41c and the polarization layer 41a.

The polarization layer 41a here may have the same structure as the polarization layer 41a in FIG. 5.

The optical adhesive layer 41b has a thickness between 0.15 mm~0.4 mm, so as to guarantee a good bonding effect of the optical adhesive layer 41b, and meanwhile, the display module has a smaller overall thickness, and optical moiré caused by a thicker optical film layer can be prevented. Exemplarily, the optical adhesive layer 41b has a thickness of 0.25 mm.

The transparent base material layer 41c is a transparent layer made of a transparent material. It should be noted that the transparent layer may specifically refer to: a film layer that has a light transmittance higher than 70% and does not change the polarization state of the light.

Optionally, the transparent base material layer 41c may be made of a material including a resin material, such as polyimide (PI), polycarbonate (PC), polyetherimide (PEI), polyethersulfone (PES), polyethylene terephthalate (PET), and polyethylene naphthalate (PEN). The transparent base material layer 41c may include a single film layer or a stack of multiple film layers. In an example, the transparent base material layer 41c is a PET film layer.

In production of the display module, the scattering film 4 may be firstly formed on the transparent base material layer 41c, and then the transparent base material layer 41c may be bonded to the polarization layer 41c outside the liquid crystal cell with the optical adhesive layer 41b. Optionally, the transparent base material layer 41c has a thickness between 150 μm and 200 μm, so as to ensure a good bearing stability of the transparent base material layer 41c, while enabling a smaller overall thickness of the display module.

When the scattering film 4 has a relatively high refractive index, the light emitted from the display panel tends to be converged (i.e., an angle between an overall angle of the light emitted from the display module and a thickness direction of the display panel is reduced), so that the viewing angle of the display module is reduced. In order to prevent this phenomenon, when the display panel employs a liquid crystal display panel, the refractive index of the scattering particles 421 is lower than or equal to a refractive index of a glass substrate between the liquid crystal layer 30 and the scattering film 4. The glass substrate is a base of the assembling substrate 20. As described above, the scattering film 4 may further include, in addition to the scattering particles 421, a dielectric material layer 422. In this case, one of the dielectric material layer 422 or the scattering particles 421 has a refractive index lower than or equal to the glass substrate between the liquid crystal layer 30 and the scattering film 4. Apparently, the scattering film 4 may include both the scattering particles 421 and the first protective layer 423, but not the dielectric material layer 422. In this case, at least one of the scattering particles 421 or the first protective layer 423 has a refractive index lower than or equal to the glass substrate between the liquid crystal layer 30 and the scattering film 4. Apparently, the scattering film 4 may include the scattering particles 421, the first protective layer 423 and the dielectric material layer 422 at the same time. In this case, at least one of the scattering particles 421, the dielectric material layer 422, or the first protective layer 423 has a refractive index lower than or equal to the glass substrate between the liquid crystal layer 30 and the scattering film 4. For example, the scattering particles 421, the dielectric material layer 422, and the first protective layer 423 each have a refractive index lower than or equal to the glass substrate.

Apparently, the display panel may be a self-luminous display panel, including: a light-emitting unit, and at least one film layer between the light-emitting unit and the scattering film 4. The self-luminous display panel may be a miniLED/micro light-emitting diode (MicroLED) display panel, or may be an organic light-emitting diode (OLED) display panel, or may be a quantum dot light-emitting diode (QLED) display panel. For a QLED/OLED display panel, the light-emitting unit includes a cathode and an anode, and a light-emitting structure between the two. For a miniLED\MicroLED display panel, the light-emitting unit is an LED chip. The film layer between the light-emitting unit and the scattering film 4 includes, for example, a packaging layer, a protective layer, a cover plate, and the like.

Similar to the liquid crystal display panel, when the display panel is a self-luminous display panel, in order to prevent convergence of the light emitted from the display panel, the scattering particles 421 may have a refractive index lower than or equal to a film layer having a maximum refractive index between the light-emitting unit and the scattering film 4. Alternatively, when the scattering film 4 includes the scattering particles 421 and the dielectric material layer 422, at least one of the scattering particles 421 or the dielectric material layer 422 has a refractive index lower than or equal to the film layer having a maximum refractive index between the light-emitting unit and the scattering film 4. When the scattering film 4 includes the scattering particles 421 and the first protective layer 423, at least one of the scattering particles 421 or the first protective layer 423 has a refractive index lower than or equal to the film layer having a maximum refractive index between the light-emitting unit and the scattering film 4. When the scattering film 4 includes the scattering particles 421, the dielectric material layer 422, and the first protective layer 423 at the same time, at least one of the scattering particles 421, the dielectric material layer 422, or the first protective layer 423 has a refractive index lower than or equal to the film layer having a maximum refractive index between the light-emitting unit and the scattering film 4. For example, the scattering particles 421, the dielectric material layer 422, and the first protective layer 423 each have a refractive index lower than or equal to the film layer having a maximum refractive index between the light-emitting unit and the scattering film 4.

An embodiment of the present disclosure further provides a display device, including the display module as described in any embodiment above. The display device is particularly suitable for large-sized display devices, such as an integrated conference tablet.

In an embodiment of the present disclosure, a scattering film 4 is provided on a light-emitting side of the display panel, which may have a good scattering effect on laser. Therefore, when a laser pointer emits laser toward the scattering film 4, the scattering film 4 can scatter the laser to various angles so that the laser spot is visible by users at different viewing angles.

After illuminating the display module with laser, it has been found that when the display panel does not include the scattering film and the laser pointer emits laser toward the display module aslant, the laser spot is visible merely at certain viewing angles, while at other viewing positions, the laser spot is hardly visible or totally invisible. By "the laser pointer emits laser toward the display module aslant", it means that an acute angle is formed between an emitting direction of the laser and the thickness direction of display panel. The "specific viewing angles" refer to viewing angles at which the viewing position and the laser pointer are respectively located at two sides of the normal line, and an angle between the viewing direction and the normal line is equal to an angle between the laser illumination direction and the normal line. The "normal line" is a line extending in the thickness direction of the display panel, and passing through a laser illuminated point on the display panel. When the display panel is provided with the scattering film, the laser spot is visible from all directions.

Figure 6A:
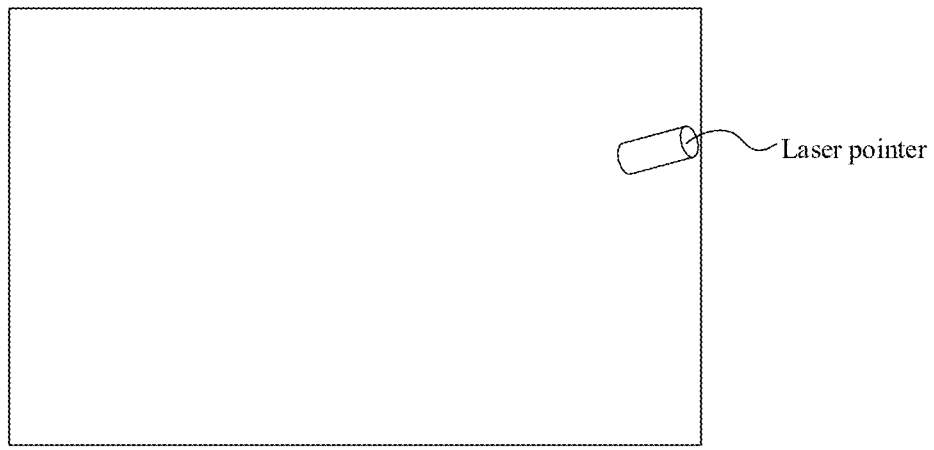
FIG. 6A is a schematic diagram showing a scattering effect of a display device without any scattering film on laser.
Figure 6B:
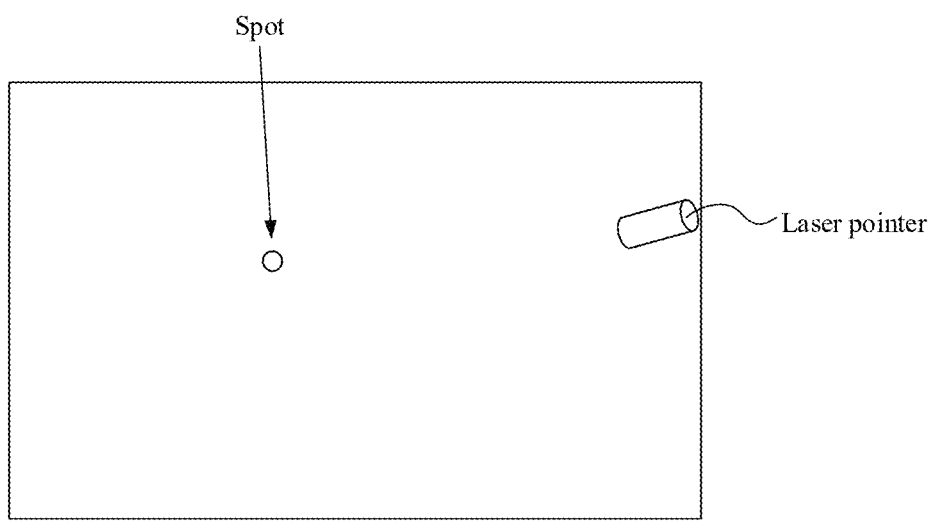
FIG. 6B is a schematic diagram showing a scattering effect of the display module in FIG. 4 on laser.
Figure 6C:
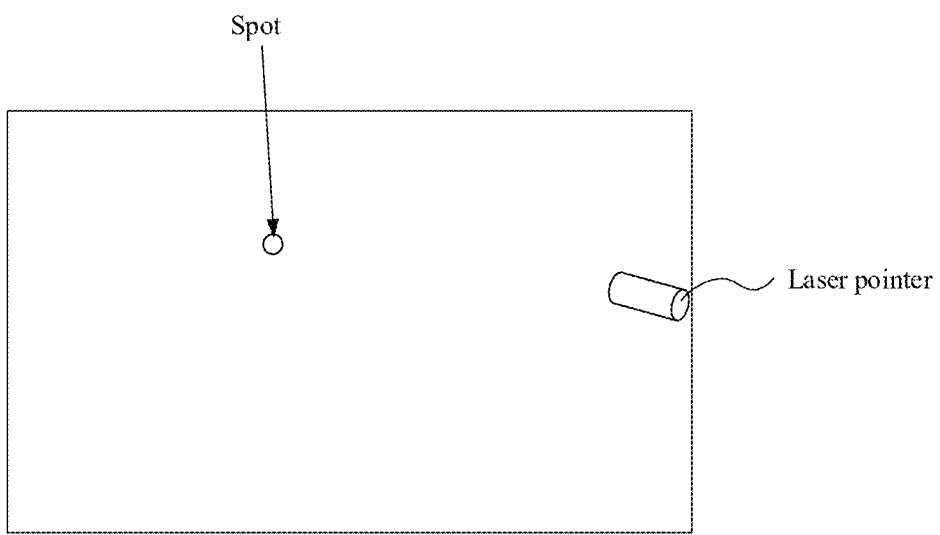
FIG. 6C is a schematic diagram showing a scattering effect of the display module in FIG. 5 on laser.

FIG. 6A is a schematic diagram showing a scattering effect of a display module without any scattering film on laser, FIG. 6B is a schematic diagram showing a scattering effect of the display module in FIG. 4 on laser, and FIG. 6C is a schematic diagram showing a scattering effect of the display module in FIG. 5 on laser. In FIG. 4, the bearing layer 41 includes a polarization layer 41a, an optical adhesive layer 41b, and a transparent base material layer 41c, and a scattering film 42 is disposed on a surface of the transparent base material layer 41c. In FIG. 5, the bearing layer 41 includes a polarization layer 41a, a scattering film 42 is directly disposed on a surface of the polarization layer 41a, and a first protective layer 43 is disposed on the scattering particle layer. In the scattering particle layer of FIGS. 4 and 5, 90% or more of the scattering particles have a particle size larger than or equal to 10 μm and less than or equal to 25 μm, and an average particle size of all the scattering particles in the scattering particle layer is larger than or equal to 16 μm and less than or equal to 17 μm. In FIGS. 6A to 6C, the laser pointer emits laser to the display module aslant. Specifically, an angle of 45° is formed between the emitting direction of the laser from the laser pointer and the thickness direction of display panel. As is visible from FIGS. 6A to 6C, when the display module does not include the scattering film 4 and a laser pointer emits laser toward the display module aslant, the laser spot is hardly visible from the front of the display module. When the display module includes the scattering film 4 and a laser pointer emits laser toward the display module aslant, the laser spot can be clearly seen from the front of the display module.

It is thus clear that when the scattering film is provided on the display panel, the laser emitted from the laser pointer can be scattered toward different angles. In this manner, when a meeting host or teacher emits laser toward the display device with a laser pointer during meeting or teaching, viewers at other viewing angles, in addition to those at "specific viewing angles" can also see the laser spot, thereby improving the meeting or teaching effect, as well as the user experience.

It will be appreciated that the above implementations are merely exemplary implementations for the purpose of illustrating the principle of the present disclosure, and the present disclosure is not limited thereto. It will be apparent to one of ordinary skill in the art that various modifications and variations may be made without departing from the spirit or essence of the present disclosure. Such modifications and variations should also be considered as falling into the protection scope of the present disclosure.

What is claimed is:

1. A display module, comprising: a display panel and a scattering film on a light-emitting side of the display panel, wherein the display panel comprises a bearing layer configured to bear the scattering film and comprising a light transmissive material, and the scattering film comprises:
   a scattering particle layer on a bearing layer, the scattering particle layer comprising a plurality of scattering particles and having a surface away from the bearing layer that is a curved surface, wherein 90% or more of the scattering particles in the scattering particle layer have a particle size larger than or equal to 5 μm and less than or equal to 30 μm,
   wherein the bearing layer comprises:
   a polarization layer configured to change a polarization state of light passing through the polarization layer, a transparent base material layer, the scattering particle layer being disposed on a surface of the transparent base material layer away from the polarization layer, and an optical adhesive layer bonded between the transparent base material layer and the polarization layer, the optical adhesive layer having a thickness between 0.15 mm~0.4 mm, wherein the scattering particle layer further comprises a dielectric material layer through which the scattering particles are fixed to a surface of the bearing layer, and the dielectric material layer has a thickness smaller than or equal to one half of an average particle size of the plurality of scattering particles.

2. The display module according to claim 1, wherein an average particle size of all the scattering particles in the scattering particle layer is larger than 10 μm and less than or equal to 25 μm.

3. The display module according to claim 2, wherein the scattering film further comprises: a first protective layer on a surface of the scattering particle layer facing away from the bearing layer, a surface of the first protective layer away from the scattering particle layer being a curved surface.

4. The display module according to claim 1, wherein an average particle size of all the scattering particles in the scattering particle layer is larger than or equal to 14 μm and less than or equal to 25 μm.

5. The display module according to claim 4, wherein the scattering film further comprises: a first protective layer on a surface of the scattering particle layer facing away from the bearing layer, a surface of the first protective layer away from the scattering particle layer being a curved surface.

6. The display module according to claim 1, wherein the scattering particles are made of a material comprising an inorganic non-metallic material or a metal oxide material.

7. The display module according to claim 6, wherein the scattering film further comprises: a first protective layer on a surface of the scattering particle layer facing away from the bearing layer, a surface of the first protective layer away from the scattering particle layer being a curved surface.

8. The display module according to claim 1, wherein the scattering film further comprises: a first protective layer on a surface of the scattering particle layer facing away from the bearing layer, a surface of the first protective layer away from the scattering particle layer being a curved surface.

9. The display module according to claim 8, wherein in at least partial region of the scattering particle layer, a surface of the first protective layer facing away from the bearing layer is conformal with the surface of the scattering particle layer facing away from the bearing layer.

10. The display module according to claim 8, wherein the first protective layer has a hardness greater than that of the scattering particles.

11. The display module according to claim 8, wherein the first protective layer is made of a material comprising an inorganic non-metallic material or a metal oxide material.

12. The display module according to claim 1, wherein the polarization layer comprises a polarization layer body and a second protective layer in stack, and the scattering film is located on a side of the second protective layer away from the polarization layer body.

13. The display module according to claim 1, wherein the display panel is a liquid crystal display panel, comprising: a liquid crystal layer, and a glass substrate between the liquid crystal layer and the scattering film, and the scattering film further comprises: a first protective layer on a surface of the scattering particle layer facing away from the bearing layer;

wherein at least one of the scattering particles, the first protective layer, or the dielectric material layer has a refractive index lower than or equal to that of the glass substrate.

14. The display module according to claim 1, wherein the display panel is a self-luminous display panel, and comprises a light-emitting unit and at least one film layer between the light-emitting unit and the scattering film, the scattering film further comprises: a first protective layer on the surface of the scattering particle layer facing away from the bearing layer;

wherein at least one of the scattering particles, the first protective layer, or the dielectric material layer has a refractive index lower than or equal to that of a film layer having a maximum refractive index between the light-emitting unit and the scattering film.

15. A display device, comprising the display module according to claim 1.

* * * * *